United States Patent
Salter et al.

(10) Patent No.: US 10,465,879 B2
(45) Date of Patent: Nov. 5, 2019

(54) VEHICULAR LIGHT ASSEMBLIES WITH LED-EXCITED PHOTOLUMINESCENT LIGHTGUIDE

(71) Applicant: Ford Global Technologies, LLC, Dearborn, MI (US)

(72) Inventors: Stuart C. Salter, White Lake, MI (US); Paul Kenneth Dellock, Northville, MI (US); Chester Stanislaus Walawender, Livonia, MI (US); Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 15/470,012

(22) Filed: Mar. 27, 2017

(65) Prior Publication Data

US 2018/0272931 A1   Sep. 27, 2018

(51) Int. Cl.
*B60Q 3/20*   (2017.01)
*F21V 9/30*   (2018.01)

(52) U.S. Cl.
CPC ..................... *F21V 9/30* (2018.02)

(58) Field of Classification Search
CPC .... B60Q 3/20; B60Q 3/30; F21V 9/08; F21V 9/30; F21V 9/32; F21V 9/38; F21S 10/005; F21S 10/023; F21K 9/61; F21K 9/64
See application file for complete search history.

(56) References Cited

U.S. PATENT DOCUMENTS

| | | | |
|---|---|---|---|
| 5,053,930 A | 10/1991 | Benavides | |
| 5,060,118 A | 10/1991 | Penrod et al. | |
| 5,709,453 A | 1/1998 | Krent et al. | |
| 5,721,795 A * | 2/1998 | Pelka | G02B 6/2817 385/12 |
| 5,813,753 A * | 9/1998 | Vriens | H01L 33/502 257/13 |
| 5,839,718 A | 11/1998 | Hase et al. | |
| 6,019,411 A | 2/2000 | Carter et al. | |
| 6,031,511 A * | 2/2000 | DeLuca | G09G 3/22 345/55 |
| 6,117,362 A | 9/2000 | Yen et al. | |

(Continued)

FOREIGN PATENT DOCUMENTS

| CN | 101337492 A | 1/2009 |
|---|---|---|
| CN | 201169230 Y | 2/2009 |

(Continued)

OTHER PUBLICATIONS

ANZO USA/Toyota Tundra 14-15 LED Tailgate Spoiler 5-Function—Tail Gate Bar—Universal Lights; last accessed Oct. 26, 2016; 1 page.

*Primary Examiner* — Ismael Negron
(74) *Attorney, Agent, or Firm* — Vichit Chea; Price Heneveld LLP

(57) ABSTRACT

A dome light assembly that includes a light-producing element comprising a polymeric film between two glass substrates, a reflective surface facing an interior, and a plurality of edges; and a controller configured to direct LED sources to (a) excite photoluminescent structures within the element to transmit decorative light patterns, and (b) transmit functional light patterns, into the interior. Further, the sources are configured to direct incident light into the edges.

13 Claims, 6 Drawing Sheets

(56) References Cited

U.S. PATENT DOCUMENTS

| | | | |
|---|---|---|---|
| 6,132,072 A | 10/2000 | Turnbull et al. |
| 6,322,225 B1 | 11/2001 | Koike |
| 6,419,854 B1 | 7/2002 | Yocom et al. |
| 6,494,490 B1 | 12/2002 | Trantoul |
| 6,577,073 B2 | 6/2003 | Shimizu et al. |
| 6,631,575 B1 | 10/2003 | Voelzke et al. |
| 6,666,571 B2 | 12/2003 | Becher et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,799,873 B2 | 10/2004 | Fox |
| 6,820,888 B1 | 11/2004 | Griffin |
| 6,829,852 B1 | 12/2004 | Uehran |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,235,792 B2 * | 6/2007 | Elofson | C09K 11/02 250/205 |
| 7,264,366 B2 | 9/2007 | Hulse |
| 7,264,367 B2 | 9/2007 | Hulse |
| 7,316,497 B2 * | 1/2008 | Rutherford | H04N 9/315 348/E9.027 |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,834,750 B1 | 11/2010 | Hertz et al. |
| 7,862,220 B2 | 1/2011 | Cannon et al. |
| 7,915,627 B2 * | 3/2011 | Li | G02B 6/005 257/98 |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,089,207 B2 * | 1/2012 | Ramer | F21K 9/232 313/498 |
| 8,097,843 B2 | 1/2012 | Agrawal et al. |
| 8,128,272 B2 * | 3/2012 | Fine | G02B 6/0021 362/606 |
| 8,136,425 B2 | 3/2012 | Bostick |
| 8,162,506 B2 * | 4/2012 | Wei | F21V 9/40 362/231 |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,651,692 B2 * | 2/2014 | Yang | F21S 8/00 362/235 |
| 8,664,624 B2 | 3/2014 | Kingsley et al. |
| 8,683,722 B1 | 4/2014 | Cowan |
| 8,702,271 B2 * | 4/2014 | Rains, Jr. | F21K 9/00 362/235 |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 10,145,539 B2 * | 12/2018 | Coe-Sullivan | H01L 33/502 |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0185195 A1 | 9/2004 | Anderson et al. |
| 2004/0213088 A1 | 10/2004 | Fuwausa |
| 2005/0146888 A1 | 7/2005 | Metcalf |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0115673 A1 | 5/2007 | Chen et al. |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251917 A1 | 10/2009 | Wollner et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2011/0267833 A1 | 11/2011 | Verrat-Debailleul et al. |
| 2011/0308693 A1 | 12/2011 | Van Nutt et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0212931 A1 * | 8/2012 | Kinoshita | G02B 6/0003 362/84 |
| 2012/0217881 A1 | 8/2012 | Sethi et al. |
| 2012/0280528 A1 | 11/2012 | Dellock et al. |
| 2012/0320621 A1 | 12/2012 | Kleo et al. |
| 2013/0321141 A1 | 12/2013 | Ariemma et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0096893 A1 | 4/2014 | Veerasamy |
| 2014/0098557 A1 | 4/2014 | Veerasamy |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0293644 A1 | 10/2014 | Levinson |
| 2014/0300463 A1 | 10/2014 | Russ |
| 2014/0373898 A1 | 12/2014 | Rogers et al. |
| 2015/0016132 A1 | 1/2015 | Verrat-Debailleul |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |
| 2017/0349094 A1 | 12/2017 | Salter et al. |

FOREIGN PATENT DOCUMENTS

| | | |
|---|---|---|
| CN | 201193011 Y | 2/2009 |
| CN | 202345586 U | 7/2012 |
| CN | 102881230 A | 1/2013 |
| CN | 204127823 U | 1/2015 |
| DE | 4120677 A1 | 1/1992 |
| DE | 29708699 U1 | 7/1997 |
| DE | 10343778 A1 | 5/2004 |
| DE | 10319396 A1 | 11/2004 |
| DE | 10350529 A1 | 3/2005 |
| EP | 1793261 A1 | 6/2007 |
| EP | 1903359 A2 | 3/2008 |
| EP | 2003393 B1 | 5/2012 |

(56) References Cited

FOREIGN PATENT DOCUMENTS

| | | | |
|---|---|---|---|
| EP | 2778209 | A1 | 9/2014 |
| JP | 2000159011 | A | 6/2000 |
| JP | 2007238063 | A | 9/2007 |
| KR | 20060026531 | A | 3/2006 |
| WO | 2006047306 | A1 | 5/2006 |
| WO | 2007077099 | A1 | 7/2007 |
| WO | 2014068440 | A1 | 5/2014 |

* cited by examiner

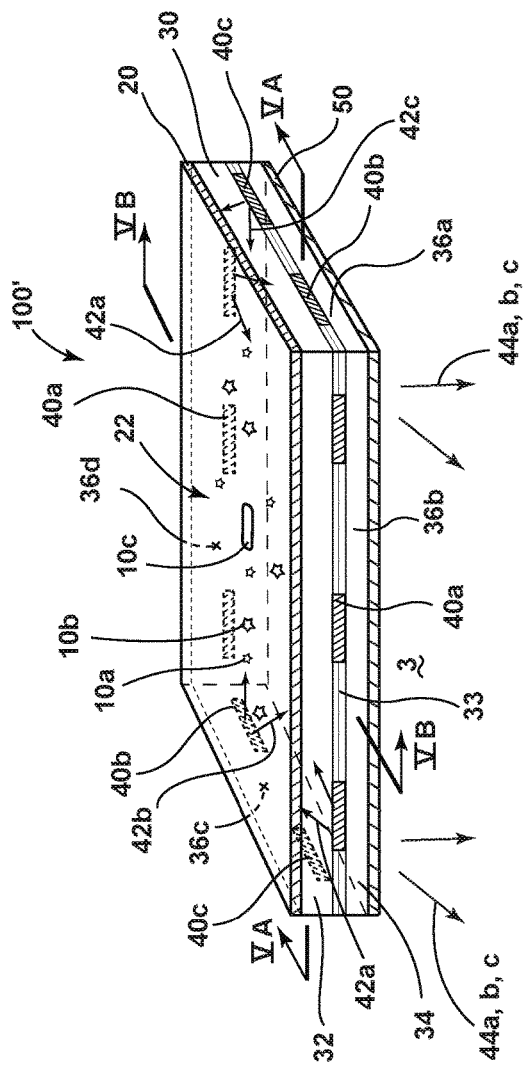
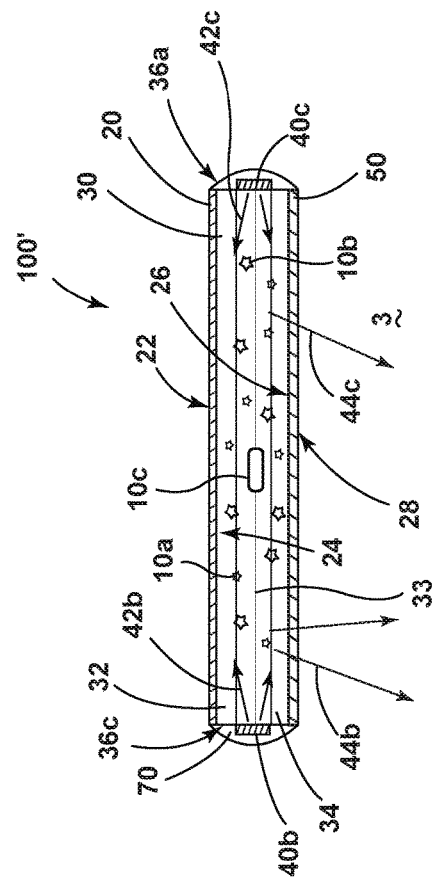
FIG. 5
FIG. 5A

VEHICULAR LIGHT ASSEMBLIES WITH LED-EXCITED PHOTOLUMINESCENT LIGHTGUIDE

FIELD OF THE INVENTION

The present disclosure generally relates to LED-based interior light assemblies that produce functional and decorative light patterns, particularly such light assemblies configured within the roof of a vehicle for vehicle-related applications.

BACKGROUND OF THE INVENTION

Vehicular interior lighting, e.g., dome lights, courtesy lights, glove box lights, foot-well lights, and other roof and side panel interior lighting, has generally been realized through the application of conventional, incandescent lighting sources for the past few decades. Although the light produced from incandescent sources is fairly uniform, it is generally accompanied by relatively high heat levels and low intensity compared to more modern light sources (e.g., light-emitting diode, fluorescent, etc.). Further, incandescent light sources have relatively high energy usage compared to more modern light sources.

In the past decade, light emitting diode (LED) sources have been employed in various lighting applications, including vehicular applications. LED sources possess many advantages over conventional lighting sources including the ability to transmit high intensity light patterns and generate low heat upon light transmission with very low energy usage. One drawback of LED sources is that the light produced from them is directional and can result in high-contrast illumination, shadowing and other undesirable effects associated with highly directional light. Consequently, in the context of vehicular interior lighting, LED sources have been difficult to use given that the directional nature of the light output from these sources has led to high contrast within the close quarters of the vehicle interior.

Some success has been realized in overcoming the directional nature of the light output from LED sources by coupling certain optics to them. In particular, near-field lens elements, collimators, light-diffusers and reflectors have been coupled to LED sources to shape their light output into uniform patterns approximating those produced by incandescent sources. Unfortunately, many of these solutions require additional packaging (e.g., larger overall lighting source dimensions) that can significantly add cost; consequently, LED sources are not prevalent in vehicular interiors, particularly as replacements to low-cost courtesy and dome lights Consumers are also increasingly demanding access to decorative lighting effects within vehicles, residences, offices and other interiors. In vehicles, decorative lighting patterns that supplement the natural light transmitted through side windows, windshields, and rear windows is often provided through lighting assemblies (e.g., fiber optics) that are independent of sun roofs, moon roofs and other non-traditional windows. Many consumers, however, find significant drawbacks associated with these separate lighting assemblies, including the loss of interior space associated with the elements needed for these decorative lighting access points, maintenance concerns, and added cost.

Accordingly, there is a need for vehicular interior lighting solutions that can employ LED sources in a low-cost fashion, with minimal packaging constraints and at low manufacturing costs. Further, as LED sources continue to be integrated within the vehicle industry, there is a desire by many consumers for unique lighting aesthetics that cannot be achieved through conventional sources.

SUMMARY OF THE INVENTION

According to one aspect of the present disclosure, a dome light assembly is provided that includes a light-producing element comprising a polymeric film between two glass substrates, a reflective surface facing an interior, and a plurality of edges; and a controller configured to direct a plurality of LED sources to transmit functional light patterns from the element into the interior. Further, the sources are configured to direct incident light into the edges.

According to another aspect of the present disclosure, a dome light assembly is provided that includes a light-producing element comprising a polymeric film between two glass substrates, a reflective surface facing an interior, and a plurality of edges; and a controller configured to direct first and second LED sources to excite respective first and second photoluminescent structures within the element to transmit decorative light patterns into the interior. Further, the sources are configured to direct incident light into the edges.

According to yet another aspect of the present disclosure, a dome light assembly is provided that includes a light-producing element comprising a polymeric film between two glass substrates, a reflective surface facing an interior, and a plurality of edges; and a controller configured to direct LED sources to (a) excite photoluminescent structures within the element to transmit decorative light patterns, and (b) transmit functional light patterns, into the interior. Further, the sources are configured to direct incident light into the edges.

Embodiments of the foregoing aspects of the dome light assembly can include any one or a combination of the following features:
  a plurality of grooves within the film, and the LED sources are further configured to direct incident light into the edges toward the grooves;
  the grooves span from an exterior surface of the film toward an interior surface of the film to a depth of about 75% to about 90% of a thickness of the film;
  the thickness of the film is from about 0.5 mm to about 3 mm, and the grooves are formed from a press having a radius from about 1 mm to about 4 mm;
  the interior is an interior of a vehicle, and the dome light assembly is configured for mounting to a roof in the interior of the vehicle;
  the controller transmits functional light patterns from the element into a plurality of locations within the interior of the vehicle based at least in part on a manual input, and the plurality of locations comprises a plurality of passenger locations within the vehicle.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

The following is a description of the figures in the accompanying drawings. The figures are not necessarily to scale, and certain features and certain views of the figures may be shown exaggerated in scale or in schematic in the interest of clarity and conciseness.

FIG. 5 is a perspective view of a light-producing element comprising a polymeric film between two glass substrates and a plurality of LED sources according to an embodiment;

FIG. 5A is a cross-sectional view through the width of the light-producing element depicted in FIG. 5;

DETAILED DESCRIPTION OF THE PREFERRED EMBODIMENTS

Figure 2:
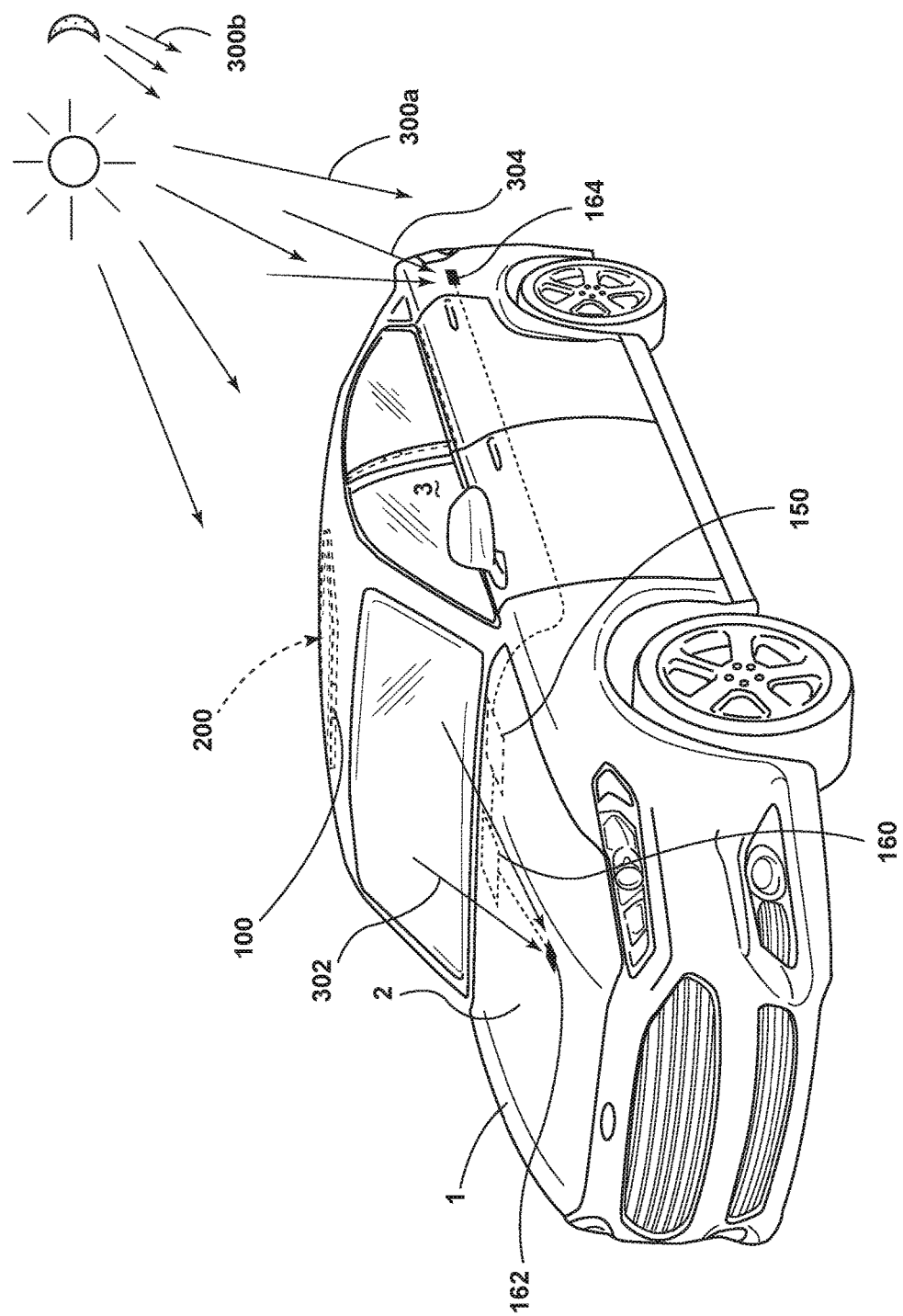
FIG. 2 is an end-on, perspective view of a vehicle containing one or more dome light assemblies according to an embodiment.

For purposes of description herein, the terms "upper," "lower," "right," "left," "rear," "front," "vertical," "horizontal," "interior," "exterior," "vehicle forward," "vehicle rearward" and derivatives thereof shall relate to the invention as oriented in FIG. 2. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Further, in this document, relational terms, such as first and second, top and bottom, and the like, are used solely to distinguish one entity or action from another entity or action, without necessarily requiring or implying any actual such relationship or order between such entities or actions.

Figure 1A:
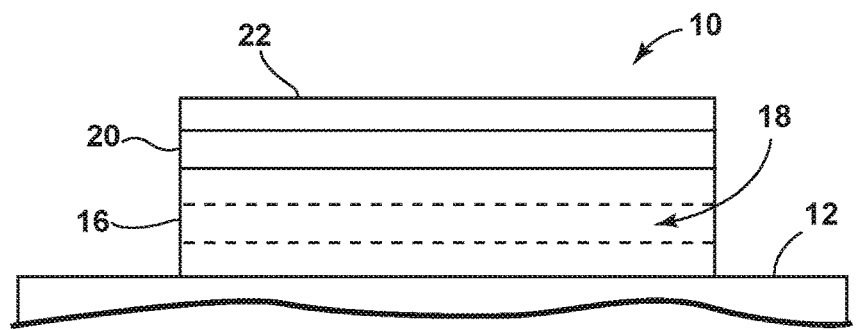
FIG. 1A is a side view of a photoluminescent structure rendered as a coating for use in a light assembly according to one embodiment.
Figure 1B:
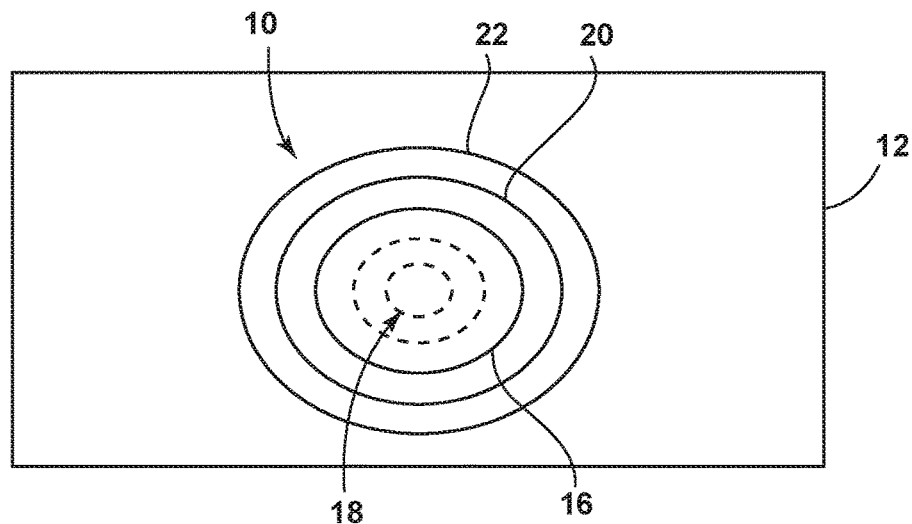
FIG. 1B is a top view of a photoluminescent structure rendered as a discrete particle according to one embodiment.
Figure 1C:
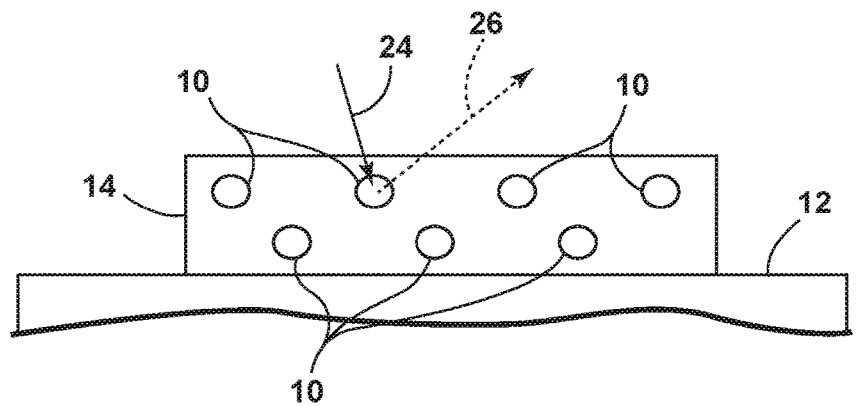
FIG. 1C is a side view of a plurality of photoluminescent structures rendered as discrete particles and incorporated into a separate structure.

Referring now to FIGS. 1A-1C, various exemplary embodiments of photoluminescent structures 10 are shown, each capable of being coupled to a substrate 12, which may correspond to a vehicle fixture, vehicle-related piece of equipment and/or one or more substrates or films within a light-producing element 30 (see, e.g., substrates 32, 34 and film 33 shown in FIGS. 3-5C). In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source (see, e.g., LED sources 40b, 40c shown in FIGS. 3-5C) is referred to herein as excitation light 24 and is illustrated herein as solid arrows. Further, excitation light 24 may be in the form of incident light from LED sources (see, e.g., incident light 42b, 42c shown FIGS. 3-5C). In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light. Further, converted light 26 may emanate from a light-producing element 30 in the form of decorative light patterns (see, e.g., decorative light patterns 44b, 44c shown FIGS. 3-5C).

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat.

No. 8,163,201 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example, doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

LED signal assemblies are being employed today with great practical effect. In the automotive industry, many vehicles now utilize LED-based lighting assemblies, generally in exterior applications (e.g., daytime running lights (DRLs)). Further, these LED-based vehicular assemblies can rely on one or multiple LED light sources, each inherently producing high light intensity with small beam angles. Accordingly, many LED-based lighting assemblies produce "hot spots" of discrete light associated with each LED light source.

Similarly, the high-efficiency and intensity aspects of LED sources open up greater possibilities for creating light patterns that mimic natural lighting for functional and decorative purposes (e.g., as a map light in a vehicle, mood lighting, light patterns in the form of an emblem or logo, etc.). Given the small beam angles of LED sources, conventional approaches to mimicking natural lighting through the use of LED sources generally rely on sophisticated optics, lenses and high quantities of LED light sources. Further, these LED-based approaches to simulating natural lighting for functional purposes have been costly.

What has not been previously understood is how to configure and design LED-based vehicular lighting assemblies to produce highly uniform, functional light and/or decorative light patterns for vehicular interior applications, including dome light assemblies, panel light assemblies and other compact, illuminated lighting assemblies. As outlined in this disclosure, dome light assemblies are provided that employ LED sources with minimal packaging constraints and at low manufacturing costs. These dome light assemblies and similar lighting assemblies can be installed in the interior of vehicles, residences, dwellings and other structures within roof, wall and other panel elements. These light assemblies can produce various functional lighting patterns within the interior of vehicles and other structures housing these assemblies. Further, these light assemblies and similar light assemblies in the disclosure can produce decorative light patterns with desirable aesthetics at a relatively low cost.

Figure 3:
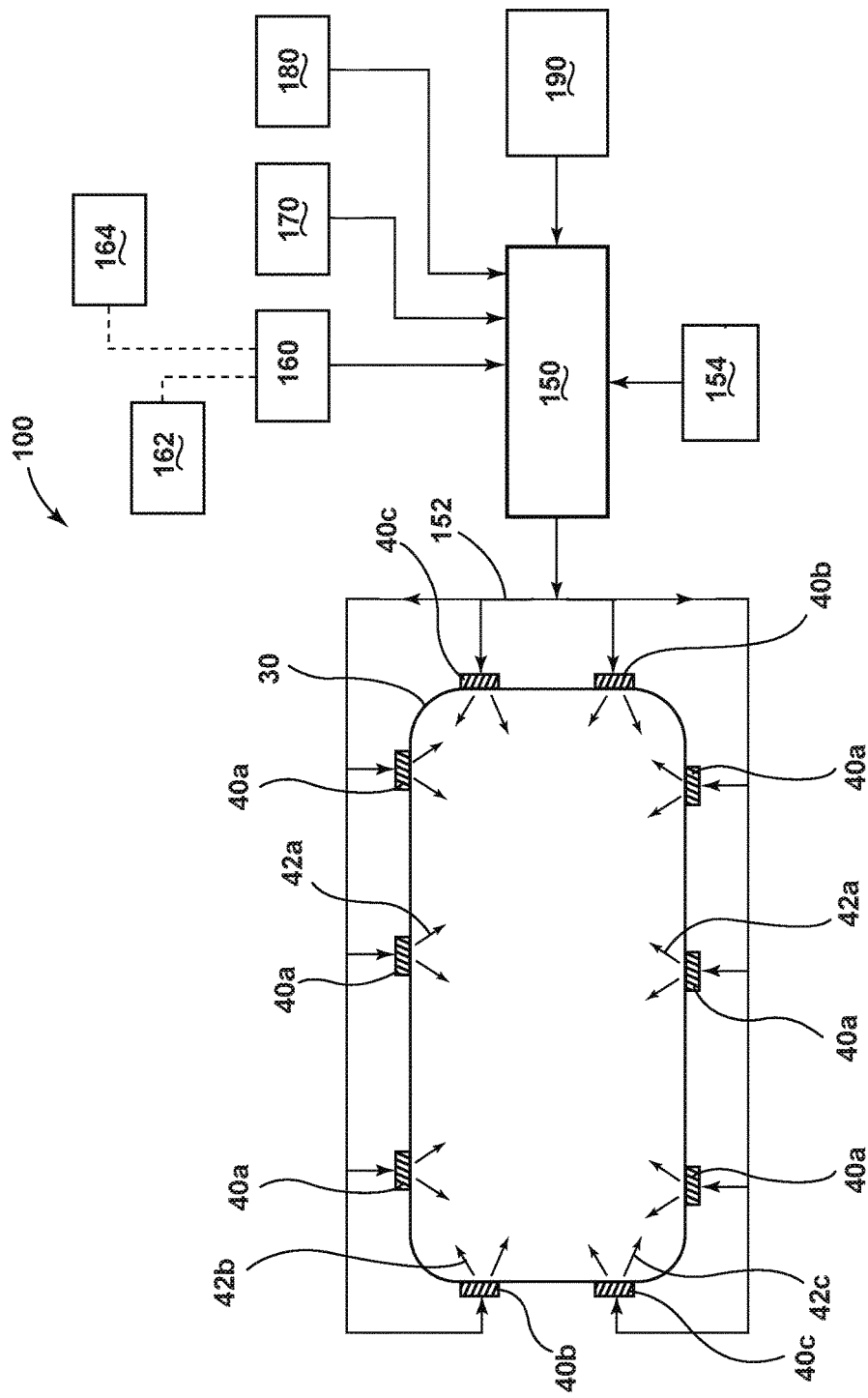
FIG. 3 is a schematic view of a dome light assembly according to an embodiment.
Figure 4:
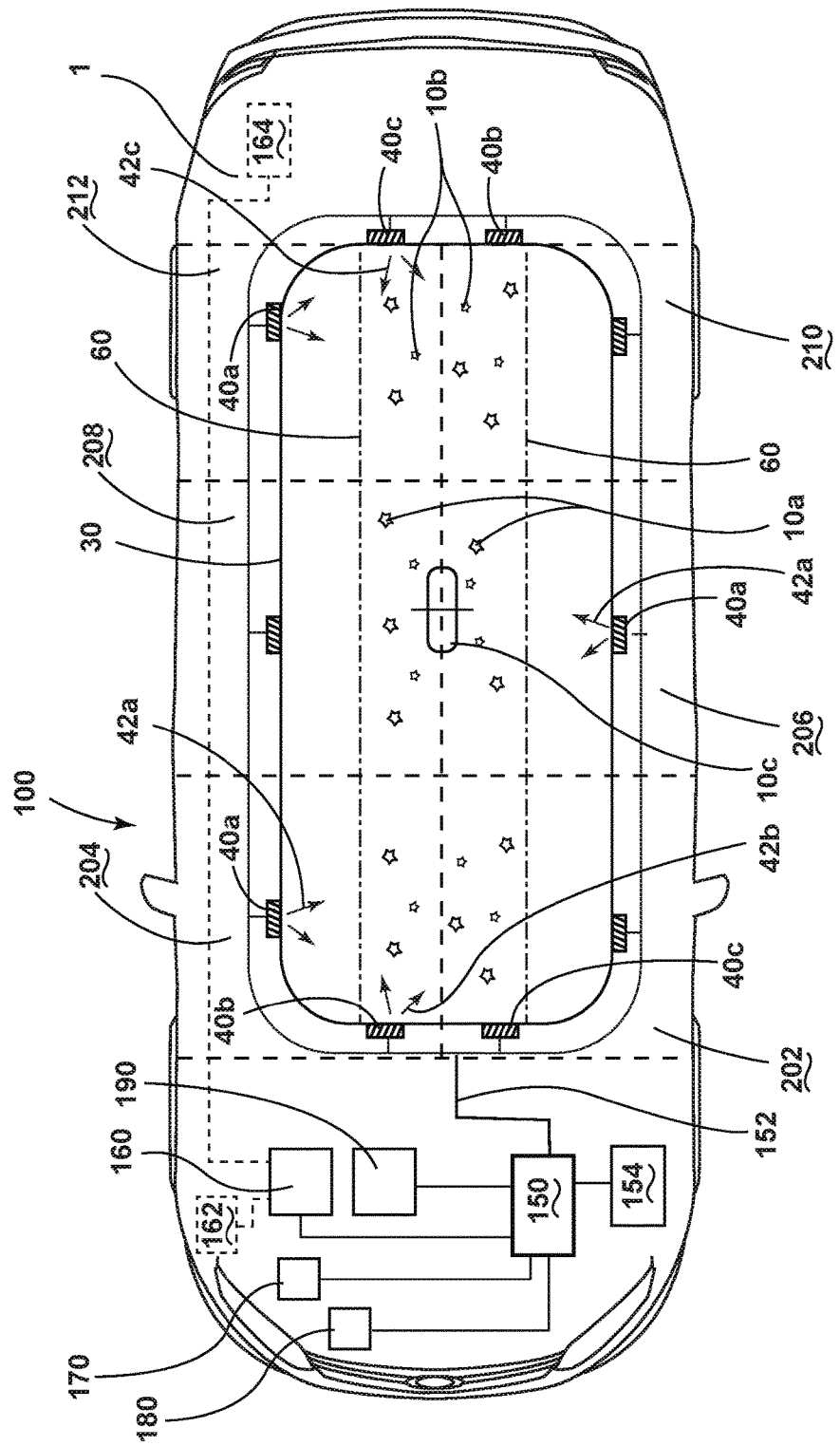
FIG. 4 is a top-down, schematic plan view of the dome light assembly and the vehicle depicted in FIGS. 2 and 3.

Referring to FIG. 2, a vehicle 1 is depicted with dome light assembly 100 as integrated within a roof 200. The dome light assembly 100 can be installed within the roof 200 of the vehicle 1 with packaging having a significantly smaller footprint than other features, e.g., a panoramic roof, a sun roof, moon roof, etc., that allow for direct transmission of ambient light from an exterior 3 of the vehicle 1 to its interior 2. According to some aspects of the disclosure, when the dome light assembly 100 is activated by a controller 150, it can transmit a functional and/or decorative light pattern into the interior 3 of the vehicle 1 from one or more LED sources of the plurality of LED sources (e.g., LED sources 40a-40c as shown in FIGS. 3-5C) contained within, or otherwise coupled to, the assemblies. For example, the functional light patterns can be in a form that provides a courtesy light function for one or more occupants of the vehicle 1. The light patterns produced and transmitted from the dome light assembly 100 emanate from the light-producing element (e.g., light-producing element 30 as shown in FIGS. 5-5C) within the assemblies themselves. Further, the controller 150 can activate one or more of the LED sources (e.g., LED sources 40a, as shown in FIGS. 3,4) of the light assembly to produce functional light patterns that are directed to various regions within the interior 3 of the vehicle 1 (e.g., regions 202, 204, 206, 208, 210 and 212 as shown in FIG. 4).

Referring again to FIG. 2, the dome light assembly 100 can also function, in certain aspects, to provide decorative light patterns within the interior 3 of the vehicle 1. In some implementations, the controller 150 can transmit these decorative light patterns based at least in part on one or more environmental inputs 160 (see also FIGS. 3, 4) to simulate aspects of ambient light, such as sunlight 300a and/or moonlight 300b, or other interesting patterns that mimic star-light, for example. In certain embodiments, the controller 150 of the dome light assembly 100 can produce these decorative light patterns based at least in part on environmental inputs 160 obtained from light sensors, such as light sensors 162, 164 situated at various locations on the exterior 2 of the vehicle 1 that receive direct sunlight patterns 302, 304 and/or moonlight 300b. Further, the controller 150 can activate one or more of the LED sources (e.g., LED sources 40b, 40c as shown in FIGS. 3, 4) to direct particular decorative light patterns within the interior 3 of the vehicle 1 to produce various effects, such as simulating star-light patterns, create luminescent designs, logos or the like, and other interesting lighting effects.

Referring now to FIGS. 3 and 4, schematic views depict the dome light assembly 100 of the disclosure in further detail. As shown in these figures, dome light assembly 100 includes a light-producing element 30 having a plurality of LED sources 40a, 40b and 40c; and a controller 150 coupled to the LED sources 40a-c via wiring 152. These LED sources 40a-c are configured within the light assembly 100 to direct incident light 42a-c into the light-producing element 30. Further, the controller 150 of the assembly 100 can be configured to direct one or more of the LED sources 40a-c to transmit light patterns (e.g., light patterns 44a-c as shown in FIGS. 5-5C) emanating from the light assembly unit 100') from the light-producing element 30 into the interior 3 of the vehicle 1 (see FIG. 2) based at least in part on one or more inputs. It should be understood that these light patterns (e.g., light patterns 44a-c as shown in FIGS. 5-5C) are derived from the incident light 42a-c that scatters and/or reflects within the light-producing element 30 and/or excites photoluminescent structures 10a-10c (see FIG. 4) within the element 30. Further, the inputs of the controller 150 include environmental inputs 160, manual inputs 170, vehicle-related inputs 180, and user program-related inputs 190. As also shown in FIGS. 3 and 4, the controller 150 can be coupled to a power source 154 in some implementations and, in other aspects, power can be derived from a source within the controller 150 or other component (not shown) within the vehicle 1.

With regard to the environmental input 160 coupled to the controller 150 of the dome light assembly 100 schematically depicted in FIGS. 3 and 4, in some embodiments the environmental input can be sunlight 300a, moonlight 300b or other ambient light on the exterior 2 of the vehicle 1 (see FIG. 2). The environmental input 160 can also be sunlight 300a, moonlight 300b or ambient light that falls on various exterior portions of the vehicle 1, as captured by various light sensors, e.g., light sensors 162, 164, arrayed on various exterior portions of the vehicle 1 (see FIG. 2). In such implementations, the dome light assembly 100 can be configured such that its controller 150 directs one or more of the LED sources 40b, 40c to direct incident light 42b, 42c to excite photoluminescent structures 10a-10c within the light-producing element 30 to produce and transmit decorative light patterns 44b, 44c (see FIG. 5A) into the interior 3 of the vehicle 1 to augment sunlight 300a (e.g., in the form of direct sunlight patterns 302, 304 as shown in FIG. 2) or augment moonlight 300b that falls on various portions of the exterior 2 of the vehicle 1 (see FIG. 2). Other environmental inputs 160 that can be employed by the controller 150 include weather inputs, global positioning system (GPS) inputs, time and date inputs (i.e., a temporal input), and moisture inputs.

With regard to the manual and user-program inputs 170 and 190, respectively, coupled to the dome light assembly 100 schematically depicted in FIGS. 3 and 4, these features can be employed at least in part by the controller 150 to direct one or more of the LED sources 40a-40c to direct functional light patterns (e.g., light patterns 44a) and/or decorative light patterns (e.g., light patterns 44b, c) within the interior 3 of the vehicle 1. The manual inputs 170 include buttons, knobs, dials, switches, mobile device touchscreen controls (e.g., via a wireless communication protocol with the vehicle 1) and other user inputs that can be manually controlled by occupants of the vehicle 1. The user-program inputs 190 can be accessed via the same buttons, knobs and the like of the user inputs 170 or other controls to store various programs and routines as understood by those with ordinary skill in the field to provide control schemes to the controller 150. For example, the controller 150 can activate one or more of the LED sources 40a in the dome light assembly 100 based at least in part on manual and/or user-program inputs 170 and 190, respectively, to generate incident light 42a within the light-producing element 30 to produce functional light patterns 44a that fall within a selected region or regions 202, 204, 206, 208, 210 and 212 of the interior 3 of the vehicle 1. Similarly, the controller 150 can activate one or more of the LED sources 40b, 40c in the dome light assembly 100 based at least in part on manual and/or user-program inputs 170 and 190, respectively, to generate incident light 42b, 42c within the light-diffusing element 30 to produce decorative light patterns 44*b*, 44*c* (see FIG. 5A) (e.g., a star-light pattern that mimics real star-light that might be visible through the element 30 on a clear night) that emanate within the interior 3 of the vehicle 1.

Figure 5B:
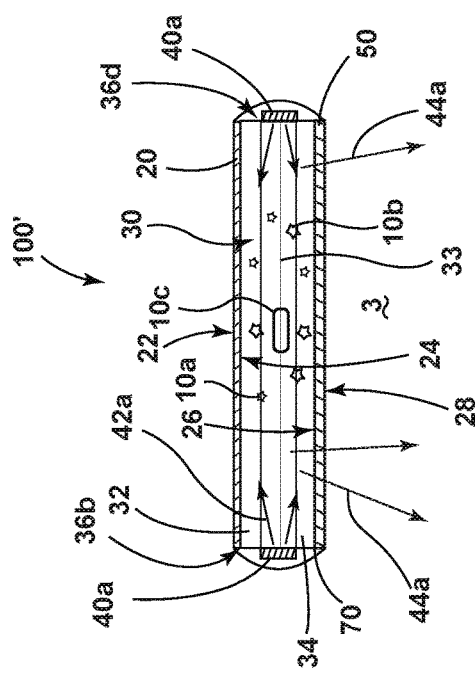
FIG. 5B is a cross-sectional view through the length of the light-producing element depicted in FIG. 5.
Figure 5C:
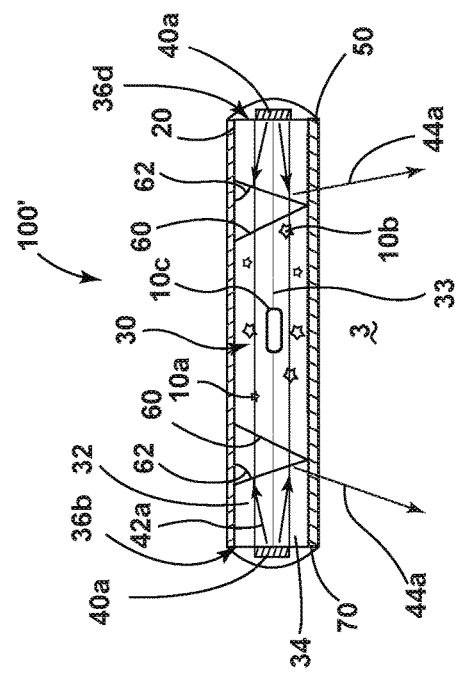
FIG. 5C is a cross-sectional view through the length of the light-producing element depicted in FIG. 5, as comprising a plurality of facets according to a further embodiment.

With regard to the vehicle-related input 180 coupled to the controller 150 of the dome light assembly 100 schematically depicted in FIGS. 3 and 4, this feature can be employed at least in part by the controller 150 to direct one or more of the LED sources 40*a*-40*c* to direct vehicle-related light patterns (e.g., functional light patterns 44*a*, as shown in FIGS. 5B, 5C, and decorative light patterns 44*b*, 44*c*, as shown in FIG. 5A) within the interior 3 of the vehicle 1 (see FIG. 2) to signal the driver and/or passengers within the vehicle 1 of certain vehicle-related indications. The vehicle-related inputs 180 include various vehicle indications such as collision warnings, emergency stop indications, hazard lights, low fuel, low tire pressure, engine warnings, another vehicle or object in a blind spot, another vehicle or object in close proximity to the vehicle, and other vehicle-related signals derived from the vehicle 1. More particularly, the controller 150 can transmit the vehicle-related light patterns based at least in part on one or more vehicular inputs 180 derived from vehicle sensors arrayed throughout the vehicle 1 and/or signals also received by other indicator elements within the vehicle 1 (e.g., the dashboard). Further, the controller 150 can activate one or more of the LED sources 40*a*-40*c* to direct incident light 42*a*-42*c* within the light-producing element 30 that, ultimately, generates particular vehicle-related light patterns in the form of light patterns 44*a*-44*c* (see FIGS. 5-5C) to various regions within the interior 3 of the vehicle 1 for particular signaling effects. For example, the controller 150 could activate certain of the LED sources 40*a*-40*c* in the dome light assembly 100 based at least in part on a vehicle-related input 180 to indicate to the driver and/or occupants of the vehicle 1 that the vehicle is in close proximity to an object closest to one or more of regions 202, 204, 206, 208, 210 and 212. As another example, the controller 150 could activate one or more of the LED sources 40*a* in the light assembly 100 based at least in part on a vehicle-related input 180, such as the opening of a door of the vehicle, to direct incident light 42*a* within the light-producing element 30 to transmit a function light pattern 44*a* to illuminate one or more regions 202, 204, 206, 208, 210 and 212 based on the vehicle state in which a particular door of the vehicle is now open.

In another embodiment, the controller 150 of a dome light assembly 100 could also activate certain of the LED sources 40*a*-40*c* in the dome light assembly 100 to provide functional and/or decorative light patterns to certain of the occupants in the rear portions of the vehicle 1 based at least in part on both manual and vehicle-related inputs 170 and 180, as depicted in FIGS. 3 and 4. More particularly, the controller 150 could partially override a user input 170 intended to direct a functional and/or decorative light pattern throughout the interior 3 of the vehicle 1 based on a vehicle-related input 180 indicating that the vehicle 1 is in motion. Upon recognizing that the vehicle 1 is in motion (i.e., based on the vehicle-related input 180), the controller 150 can then direct a functional and/or decorative light pattern to only occupants in the rear portion of the vehicle (e.g., regions 208, 210, 212) to prevent excess glare from the dome light assembly 100 from reaching the driver in the front portion of the interior 3 of the vehicle 1.

Referring now to FIGS. 5-5C, a light assembly unit 100' of a dome light assembly 100 (e.g., as shown in FIGS. 3 and 4) is depicted can include a light barrier 20 with exterior and interior-facing surfaces 22 and 24, respectively. When the dome light assembly 100 is installed in the roof of a vehicle, the exterior-facing surface 22 of the barrier 20 can face an exterior of the vehicle (e.g., an exterior 2 of the vehicle 1 as shown in FIG. 2). The exterior-facing surface 22 of the barrier 20 can also face an exterior of a fixture, element, or other structure containing the light assembly unit 100' of the dome light assembly 100. The interior-facing surface 24 of the barrier 20 faces an interior of the structure (e.g., the interior 3 of the vehicle 1 as shown in FIG. 2) containing the light assembly unit 100'. In some aspects of the light assembly unit 100', the light barrier 20 can be a thin substrate derived from a glass, glass-ceramic, polymeric, steel or composite composition. The light barrier 20 is typically affixed at its exterior-facing surface 22 to a roof 200 of the vehicle 1 (FIG. 2) or other panel of the structure housing the light assembly unit 100' of the dome light assembly 100. Further, the thickness of the light barrier 20 can range from about 0.0075 mm to about 5 cm in certain embodiments. In aspects of the light assembly unit 100' in which the light barrier 20 is essentially a thin layer or film, the light barrier 20 can have a thickness from about 0.0075 mm to about 0.25 mm. In other embodiments, light barrier 20 is in the form of a substrate and can range in thickness from about 1 mm to about 5 cm.

As further depicted in FIGS. 5-5C, the light barrier 20 typically includes a reflective, interior-facing surface 24. Further, the reflective, interior-facing surface 24 in such configurations can include specular or non-specular (e.g., white matte) surfaces, both of which are intended to reflect incident light 42*a-c* from the LED sources 40*a*-40*c* with high efficiency and little absorption. In some embodiments, the reflective interior-facing surface 24 is mirror-like with high specular reflectivity. For example, the reflective interior-facing surface 24 can be a highly-reflective coating applied through vacuum metallization (e.g., a vacuum-metallized chromium coating from Leonhard Kurz Stiftung & Co. KG ("Kurz")). Functionally, the interior-facing surface 24 of the light barrier 20 can serve to reflect incident light 42*a-c* from the LED sources 40*a*-40*c* within the light-producing element 30. As the interior-facing surface 24 of the light barrier 20 serves to reflect this light within the light-producing element 30, little to no light loss from the LED sources 40*a*-40*c* occurs through the light barrier 20 into the roof 200 or other structure housing the light assembly unit 100' and the dome light assembly 100.

In some implementations of the light assembly unit 100' depicted in FIGS. 5-5C, the light barrier 20 is not present or is otherwise configured to ensure that the light-producing element 30 is characterized by a high light transmissivity in the visible spectrum. In embodiments, the light assembly unit 100', including the optional light barrier 20, is configured with an optical transmissivity of at least 85%, at least 90%, or at least 95% over the visible spectrum. According to some embodiments, the light assembly unit 100' can be employed in a dome light assembly 100 suitable for use as a panoramic roof, sun-roof or moon-roof element (see FIG. 2). That is, the light assembly unit 100' installed within the light assembly 100 and roof 200 ensures that sunlight 300*a* and/or moon-light 300*b* can be transmitted from the exterior 2 to the interior 3 of the vehicle 1 (see FIG. 2).

Still referring to FIGS. 5-5C, the light assembly unit 100' of the dome light assembly 100 further includes a light-producing element 30 that is arranged over the light barrier 20. More particularly, the light-producing element 30 is disposed over the interior-facing surface 24 of the barrier 20. In certain aspects of the assembly unit 100', the element 30 comprises a film 33 situated between two substrates 32, 34, all disposed below or on the interior-facing surface 24 of the light barrier 20. In some aspects, the light-producing element 30 is affixed directly to or spaced from the light barrier 20. More generally, the light-producing element 30 has an average thickness that can range from about 0.5 mm to about 50 mm. As shown in exemplary form in FIGS. 5-5C, the thickness of the light-producing element 30 can be held substantially constant. In other implementations of the dome light assembly 100, however, the thickness of the light-producing element 30 employed in the light assembly unit 100' can vary at various locations within the unit 100'.

In some aspects, the light-producing element 30 includes one or more substrates 32, 34. The substrates 32, 34 can be fabricated from various translucent, semi-translucent or other optical materials, including glass and polymeric materials. In a preferred embodiment, the substrates 32, 34 are fabricated from any of the class of glass compositions suitable for use in vehicular passenger windows and windshields, as understood by those with ordinary skill in the field of the disclosure. In embodiments, the optical transmissivity of each of the substrates 32, 34 employed in the light-producing element 30 is at least 85% within a range of 400 nm to 700 nm.

Referring again to FIGS. 5-5C, the light-producing element 30 can include a film 33 disposed between the substrates 32, 34, or a film 33 disposed on one of the substrates 32, 34 in configurations having only one substrate. In other embodiments, the light-producing element 30 can comprise a plurality of films 33, particularly in configurations employing three or more substrates 32, 34. According to some embodiments of the light-producing element 30, the film 33 comprises a polymeric material with a thickness from about 0.1 mm to about 10 mm. In a preferred embodiment, the film 33 comprises a polyvinyl butyral (PVB) film having a thickness from about 0.5 mm to about 3 mm.

As also depicted in FIGS. 5-5C, the light-producing element 30 can be configured in a rectangular shape. More particularly, the element 30 includes first and second opposed edges 36a and 36c and third and fourth opposed edges 36b and 36d, respectively. Further, the light assembly unit 100' includes one or more LED sources 40a, 40b, and 40c configured to direct incident light 42a, 42b, 42c, respectively, into edges 36a, 36b, 36c and 36d, respectively. The incident light 42a from the LED sources 40a travels within the light-producing element 30, and then scatters within the element 30, reflects off of the light barrier 20 and/or exits the element 30 toward the interior 3 (e.g., of the vehicle 1 as shown in FIG. 2) as a functional light pattern 44a (see FIGS. 5B, 5C). Further, the incident light 42b, 42c from the LED sources 40b, 40c travels within the light-producing element 30 and excites photoluminescent structures 10a, 10b and 10c. The excited light then exits the element 30 into the interior 3 (e.g., of the vehicle 1 as shown in FIG. 2) as decorative light patterns 44b, 44c. In addition, it should be understood that excited light from the photoluminescent structure 10c (e.g., as configured as a logo or other design) exits the light-producing element 30 as part of the decorative light pattern 44b and/or 44c, depending on the LED sources 40b, 40c that have excited it with their respective incident light 42b, 42c.

Referring again to FIGS. 5-5C, various types of LEDs are suitable for use as the LED sources 40a-40c including, but not limited to, top-emitting LEDs, side-emitting LEDs, and others. Further, these LED sources 40a-c can produce light within a wide spectrum as white light. In other embodiments, the LED sources 40b and 40c are configured to produce respective incident light 42b and 42c at particular wavelength ranges, which may differ from one another in some embodiments or otherwise overlap with one another in others. In a preferred embodiment, the LED sources 40b and 40c are selected to produce incident light 42b, 42c at particular wavelength ranges to correspond with particular wavelength ranges that are suitable for excitation of particular photoluminescent structures 10a-10c. For example, the LED sources 40b can be tailored to produce blue incident light 42b to excite a photoluminescent structure 10a, itself tailored for excitation by blue light, to transmit a decorative light pattern 44b. Similarly, the LED sources 40c can be tailored to produce ultraviolet incident light 42c to excite photoluminescent structures 10b, 10c, each tailored for excitation by ultraviolet light, to transmit a decorative light pattern 44c. In a preferred embodiment, a light-producing element 30 comprises LED sources 40b, 40c that transmit incident light 42b, 42c at particular wavelength ranges that are tailored to excite particular photoluminescent structures 10a-10c to produce distinct decorative light patterns 44b, 44c. Further, such light-producing elements 30, as employed within a light assembly 100, can be controlled by a controller 150 (see FIGS. 3 and 4) to produce alternating decorative light patterns 44b, 44c, depending on which LED sources 40b, 40c have been activated by the controller 150.

Still referring to FIGS. 5-5C, the light-producing element 30 of the light assembly unit 100' can further include a protective film 50 disposed over the surface of the element 30. The protective film 50 has an interior-facing surface 28 facing the interior 3 of the structure containing the unit 100' and an exterior-facing surface 26 facing the light-producing element 30. Preferably, the protective film 50 has high optical clarity with substantial transparency. For example, the protective film 50 can include a scratch-resistant film (e.g., a fluorosilane coating) that is deposited directly onto the light-producing element 30.

Referring again to FIGS. 5-5C, the light assembly unit 100' can additionally be configured with edge seals 70 that are configured to seal the edges 36a, 36b, 36c and 36d of the light-producing element 30, light barrier 20 and protective film 50 (if present). In some aspects, the seal 70 is a thermoset, polymeric material that can be applied with a relatively low viscosity to seal these features (e.g., the light barrier 20, light-producing element 30 and protective film 50) before curing. In other aspects of the light assembly unit 100', the seal 70 is a thermoplastic material that is applied with a relatively low viscosity at an elevated temperature and cooled to seal these features. In certain embodiments, the seal 70 can be formed over these features of the light assembly unit 100' to provide a hermetic and corrosion-resistant seal over them.

Referring again to FIGS. 5-5C, the light assembly unit 100' is provided that includes, among other features, a plurality of LED sources 40a-40c that are configured along the edges 36a, 36b, 36c and 36d. In certain embodiments of the light assembly unit 100', the LED sources 40a are spaced equally from one another along each of the respective edges 36b and 36d and the LED sources 40b and 40c are spaced in an alternating fashion along edges 36a and 36c (see also FIGS. 3 and 4). In other aspects of the light assembly unit 100', the LED sources 40a are spaced with non-constant dimensions. For example, more LED sources 40a on an edge 36b could be concentrated toward an edge 36c in the vehicle rearward direction to increase the extent of the functional light pattern 44a in the vehicle rearward direction to better encompass the rear passengers in a vehicle containing a dome light assembly 100 having such a light assembly unit 100'. Accordingly, the light assembly unit 100' can employ various quantities and combinations of LED sources 40a, 40b, and 40c and spacings for these sources, depending on the dimensions of the edges 36a, 36b, 36c and 36d, along with other considerations regarding the desired location(s) of the functional and decorative light patterns 44a-c that emanates from the unit 100' into the interior 3 of the vehicle 1 or other structure housing the unit 100'.

With further regard to the light assembly unit 100' depicted in exemplary fashion in FIGS. 5-5C, the shape factor of the various components of the unit 100' can change depending on the application for the unit 100' and the light assembly 100 that incorporates the unit 100'. For example, the light assembly unit 100' could take on a circular, elliptical, triangular, rhombohedral, or another irregular shape. Accordingly, certain implementations of the light assembly unit 100' will have a plurality of LED sources (e.g., LED sources 40a, 40b, 40c, etc.) along the edge(s) of any such shapes. In other aspects, the LED sources 40a, 40b, and/or 40c could be mounted in proximity to the edges of such shapes without touching them (e.g., hide them from view within the structure of a roof 200 in a vehicle 1 as shown in FIG. 1).

Referring now to FIG. 5C, the light assembly unit 100' in certain embodiments can include a light-producing element 30 with one or more tapered facets 60 cut at a tapered cut angle 62 with respect to the light barrier 20. These facets 60 can be installed within the light-producing element 30 to further control incident light 42a from the plurality of LED sources 40a (see also FIG. 4). In certain aspects, the facets 60 are simple cuts made through the light-producing element 30 to change the local index of refraction within the element at the location of the facet. In particular, the facets 60 can prevent incident light 42a emanating from a set of LED sources, e.g., sources 40a from reaching across the complete element 30. For example, incident light 42a from LED source 40a directed at an edge 36b that emanates through the light-producing element 30 can be directed away from the opposing edge 36d by reflecting off of the tapered facets 60 (see FIG. 5C). In certain embodiments, the tapered facets 60 are installed at a tapered cut angle 62 that ranges from 0 to 90 degrees (e.g., as including a vertical and a horizontal facet 60), preferably from 30 to 60 degrees, and even more preferably, between 40 and 50 degrees. In other implementations, the tapered facets 60 are configured to span less than the full thickness of the light-producing element 30, particularly for embodiments in which at least some incident light 42a is intended to scatter across the full width and/or length of the element 30.

According to some aspects of the light assembly unit 100' (e.g., as employed in a light assembly 100) depicted in FIG. 5C in exemplary form, the facets 60 are installed as grooves only in the film 33 that is disposed between two substrates 32, 34 (not shown). In embodiments, the facets 60 in the form of grooves span the exterior surface of the film 33 (e.g., as facing the interior 3) to a depth of about 75% to about 90% of the thickness of the film 33. For example, the facets 60 can be formed in the film 33 by embossing or otherwise pressing a tool having a radius of about 1 mm to about 4 mm.

Variations and modifications can be made to the aforementioned structure without departing from the concepts of the present invention. For example, the dome light assembly 100 (see FIGS. 2-4) can be installed in other vehicular locations, e.g., a rear passenger window, an interior panel, etc., and serve a similar function as outlined earlier in the disclosure, including the ability to produce functional and/or decorative light patterns. As another example, the dome light assembly 100 can be employed in other non-vehicular applications (e.g., a residential window, ceiling panel, etc.) and serve a similar function as outlined earlier in the disclosure including the ability to produce functional and/or decorative light patterns. Such variations and modifications, and other embodiments understood by those with skill in the field within the scope of the disclosure, are intended to be covered by the following claims unless these claims by their language expressly state otherwise.

What is claimed is:

1. A dome light assembly, comprising:
   a light-producing element comprising a polymeric film between two glass substrates, a reflective surface facing an interior, and a plurality of edges; and
   a controller configured to direct first and second LED sources to excite respective first and second photoluminescent structures within the element to transmit decorative light patterns into the interior,
   wherein the sources are configured to direct incident light into the edges, and
   further wherein the first and second LED sources are configured to transmit incident light at respective first and second wavelength ranges, and the first and second photoluminescent structures are configured for excitation at the respective first and second wavelength ranges.

2. The assembly according to claim 1, wherein the first wavelength range comprises blue light and the second wavelength comprises ultraviolet light.

3. The assembly according to claim 1, wherein the interior is an interior of a vehicle, and further wherein the assembly is configured for mounting to a roof in the interior of the vehicle.

4. The assembly according to claim 1, further comprising:
   a plurality of grooves within the film,
   wherein the sources are further configured to direct incident light into the edges toward the grooves.

5. The assembly according to claim 4, wherein the grooves span from an exterior surface of the film toward an interior surface of the film to a depth of about 75% to about 90% of a thickness of the film.

6. The assembly according to claim 1, further comprising:
   a third photoluminescent structure within the element,
   wherein the controller is further configured to direct the second LED sources to excite the third photoluminescent structure to transmit a decorative light pattern into the interior.

7. The assembly according to claim 6, wherein the third photoluminescent structure comprises a long-persistence phosphor and is configured for excitation at the second wavelength range.

8. A dome light assembly, comprising:
   a light-producing element comprising a polymeric film between two glass substrates, a reflective surface facing an interior, and a plurality of edges; and
   a controller configured to direct LED sources to (a) excite photoluminescent structures within the element to transmit decorative light patterns, and (b) transmit functional light patterns, into the interior,
   wherein the sources are configured to direct incident light into the edges,
   wherein the interior is an interior of a vehicle, and further wherein the assembly is configured for mounting to a roof in the interior of the vehicle,
   wherein the controller transmits the functional light patterns from the element into a plurality of locations within the interior of the vehicle based at least in part on a manual input, and further wherein the plurality of locations comprises a plurality of passenger locations within the vehicle.

9. The assembly according to claim 8, further comprising:
a plurality of grooves within the film,
wherein the sources are further configured to direct incident light into the edges toward at least one of the grooves and the photoluminescent structures.

10. The assembly according to claim 9, wherein the grooves span from an exterior surface of the film toward an interior surface of the film to a depth of about 75% to about 90% of a thickness of the film.

11. A dome light assembly, comprising:
a light-producing element comprising a polymeric film between two glass substrates, a reflective surface facing an interior, and a plurality of edges; and
a controller configured to direct a plurality of LED sources to transmit functional light patterns from the element into the interior,
wherein the sources are configured to direct incident light into the edges,
wherein the interior is an interior of a vehicle, and further wherein the assembly is configured for mounting to a roof in the interior of the vehicle,
wherein the controller transmits functional light patterns from the element into a plurality of locations within the interior of the vehicle based at least in part on a manual input, and
further wherein the plurality of locations comprises a plurality of passenger locations within the vehicle.

12. The assembly according to claim 11, further comprising:
a plurality of grooves within the film,
wherein the sources are further configured to direct incident light into the edges toward the grooves.

13. The assembly according to claim 12, wherein the grooves span from an exterior surface of the film toward an interior surface of the film to a depth of about 75% to about 90% of a thickness of the film.

* * * * *